March 17, 1970  J. BOILEAU  3,500,889
TIRES
Filed Oct. 17, 1966  2 Sheets-Sheet 1
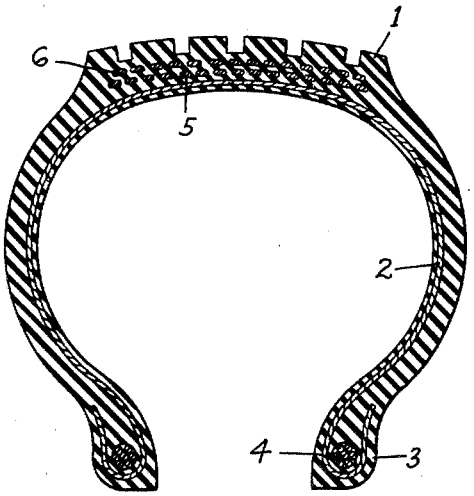
FIG.1.
FIG.2.
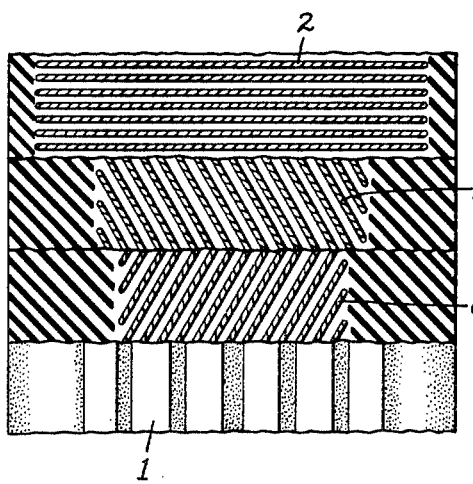
FIG.3.
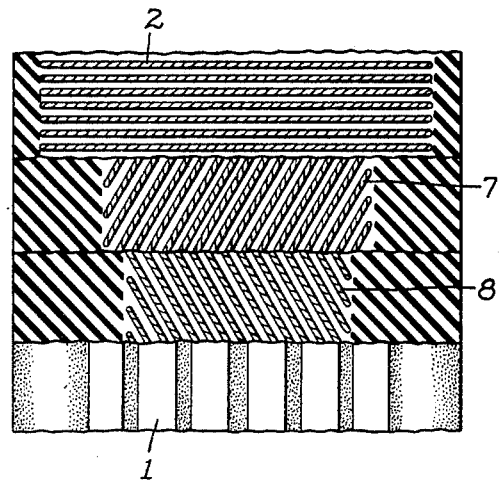
FIG.4.
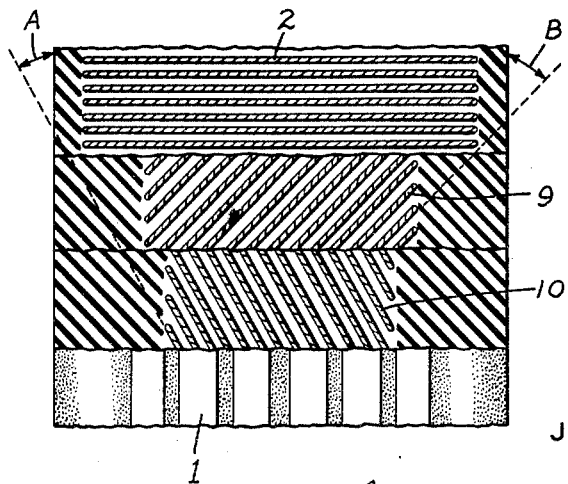
INVENTOR
JACQUES BOILEAU
BY
HIS ATTORNEYS March 17, 1970  J. BOILEAU  3,500,889
TIRES Filed Oct. 17, 1966  2 Sheets-Sheet 2

INVENTOR
JACQUES BOILEAU
BY

HIS ATTORNEYS 3,500,889
TIRES
Jacques Boileau, Clermont-Ferrand, France, assignor to Compagnie Generale des Etablissements Michelin, raison sociale Michelin & Cie, Clermont-Ferrand, France
Filed Oct. 17, 1966, Ser. No. 587,334
Claims priority, application France, Oct. 19, 1965, 35,515
Int. Cl. B60c 9/06
U.S. Cl. 152—361                                3 Claims

ABSTRACT OF THE DISCLOSURE

An asymmetric tire specially adapted for use on a particular side of a vehicle having a breaker belt of three plies wherein the innermost and outermost plies are half plies disposed on opposite sides of the median plane and the intermediate ply is substantially coextensive with the tread portion.

---

This invention relates to improvements of pneumatic tires, and more particularly to the arrangement in tires of the plies of cords, e.g., metallic, natural, synthetic or glass fibre cords, constituting the reinforcements of tires.

It has been known for a long time that tires, even if identical, behave and wear differently when they are mounted on the right or on the left side of a vehicle. It is for these reasons, among others, that periodical rotation of the tires is recommended, i.e., shifting the tires on the right side of a vehicle to the left side and from the back to the front, and vice versa. The difference in behavior was believed to be caused by bad distribution of the weight of the vehicle between the two sides inasmuch as the generally more or less curved cross-section of the road causes the tires on the right side to be loaded more heavily and to slide or scuff more, at least in the countries with driving on the right. Of course, the difference in wear resulting from mounting the tires on one side or the other may vary according to the types of tires used.

It has now been discovered that the difference in behavior, and especially the difference in the life span of tires, in accordance with the side of mounting, is not due solely to the camber of the road, i.e., to one or more causes extraneous to the tire, but rather, and to the greatest extent, to an effect having to do with the structure of the tire itself. Specifically, it has been found that a tire of a given structure wears better when mounted on a wheel on one side of the vehicle than on the other, and such side may be either the right or the left side of the vehicle. Tests have shown that it is important to provide certain differences in structure between a tire intended to be installed on the right side of a vehicle and a tire to be installed on the left side.

The factor responsible for the variation in the behavior of a tire, depending on whether it is mounted on the right or on the left, is the direction of the cord plies with which it is reinforced. Furthermore, it is obvious that two strictly identical tires, both having the same direction of plies and an equal number of plies, do not constitute a symmetrical unit if one of the tires is mounted on the right and the other on the left of the same axle.

A tire mounted on the right side of a vehicle is subject to more stress and wear in curves towards the left than the tire on the left, while a tire mounted on the left side is subject to greater stress and wear in turns to the right. As a matter of fact, centrifugal force tends to bring the larger part of the weight of the vehicle to bear on the tires placed on the outer side when in a turn and this effect increases with the speed. It follows that a right tire should be constructed in such a manner as to be able to withstand the severe conditions when caused to travel with an imposed drift towards the left and the left tire constructed to withstand the severe conditions imposed when turning to the right. It should be understood that the working ply which is closest to the tread, i.e., the last working ply, is located so as to be subjected to the most severe stress.

In accordance with the present invention, symmetry is established between tires mounted at opposite sides of the vehicle to obtain uniformity of their performance and especially to eliminate to a large extent the difference in wear of the tires in service. The invention also, in some cases, enables the amount of reinforcing material in the tires to be reduced, contrary to the prior practice in which the carcass of a tire to be mounted either on the left or the right was reinforced in order to improve the life of the tire when mounted in an unfavorable position.

In accordance with the invention, tires are provided with reinforcements consisting of superimposed plies of wires or cords and are characterized in that the last working ply is directed towards the left for a tire to be mounted on the right-hand side of a vehicle and towards the right for a tire to be mounted on the left-hand side of the vehicle, whereby the angle of its cords with respect to the path travelled is reduced in the region of contact with the ground and so that the ply may offer the maximum resistance to flexing and deformation.

As used herein, the following terms shall have the following meanings:

(a) A "right" tire is a tire to be mounted on one of the wheels on the right side of the vehicle, i.e., to the right in relation to the ordinary direction of travel; of course, a "left" tire is a tire to be mounted on the other side of the vehicle;

(b) A ply of cords "directed to the right" is a ply arranged in the tire in such a manner that its wires or cords run from the bottom up and from left to right for an observer who inspects the outer surface of the tire along a sight line which is perpendicular to the axis of the tire, and a "ply directed towards the left" has a direction of its wires and cords which is directed oppositely to that of a ply directed towards the right in relation to the median longitudinal plane of the tire;

(c) The "last" ply in a series of plies superimposed one on top of the other is that ply which is placed at the greatest distance from the axis of the casing, in other words, that ply which in the course of manufacture of the tire is placed last; obviously, the "first" ply will be closest to the axis;

(d) A "working ply" is a ply, the role of which is essentially to resist the stresses to which the tire is subjected. It may be a carcass ply, extending from one bead to the other, or a peak ply, i.e., a ply placed exclusively between the tread and the carcass. The protective plies made of cords definitely less resistant to compression or traction, in particular in the axial direction of the tire, or made of cords as resistant as the cords of the working ply but spaced farther apart and less numerous per unit of ply surface, are not considered to be working plies. Neither are the triangulation or support plies, the role of which is essentially to connect the wires or cords of the working plies and which, furthermore, in practice are not generally placed in the last position, or also have a clearly different direction from the direction of the working plies and/or have a resistance which is well below the resistance of the working plies. Thus, if a reinforcement comprises plies of wires or cords made of widely varying materials (for example, steel and nylon, or glass and rayon) or of wires or cords having different modules of elasticity, the last working ply is normally a ply consisting of the most rigid cords and a ply consisting of more elastic cords and adjacent to and on either side of the more rigid ply is a support ply.

As examples of arrangements of plies in accordance with the invention, there may be mentioned the following arrangements, all of which are intended to be used in a right tire.

For a left tire, the direction of all plies or at least of the last ply and of the ply or plies combined with the last ply will be reversed.

EXAMPLE 1

In a tire with a radial carcass comprising a crown reinforcement consisting only of two plies (working plies) of steel cords: the first crown ply is directed towards the right, the second and last towards the left.

EXAMPLE 2

In a tire with a radial carcass comprising an unsymmetrical crown reinforcement consisting of plies (working plies) of steel cords: the first crown ply is directed towards the right, the second crown ply is directed towards the left and extends between the median plane and one edge of the tread, and the third crown ply extends between the median plane and the other edge of the tread and is directed towards the left but at an angle which is different from that of the second ply.

EXAMPLE 3

In a tire with a radial carcass comprising a crown reinforcement consisting of two plies of cords slightly inclined over the longitudinal median plane (working plies) and a ply of cords forming a wide angle with the same plane (triangulation ply): regardless of the direction of the location of the triangulation ply, the first working ply in accordance with the invention will be directed towards the right and the second towards the left.

EXAMPLE 4

In a tire with a radial carcass comprising a crown reinforcement consisting of a working ply of steel cords and a ply of nylon cords (supporting ply): the working ply of steel cords is directed towards the left, the support ply of nylon cords is directed towards the right, regardless of whether it is placed above or below the working ply.

EXAMPLE 5

In a tire with a radial carcass comprising a crown reinforcement consisting of two or any other number of sets of working plies of nylon cords, each set comprising at least two plies of the same direction, the last set is to be directed towards the left.

EXAMPLE 6

In a tire with a crossed carcass comprising 2, 4, 6 or more carcass plies, half of which are directed towards the right and the other half towards the left: in accordance with the invention, the last ply shall be directed towards the left, whether there is alternation of direction for each group of two plies or at a different frequency, whether or not the tire contains between the carcass and the tread protective plies which are less resistant than the carcass, whether the carcass plies be of steel, rayon or any other material.

Other variations are possible and the invention may be applied to any tire structure when the reasons for the novel arrangements are understood.

If the working plies are not arranged symmetrically in relation to the median plane, i.e., their cords form different angles, it is important to choose as the last ply that ply having cords which form the smallest angle with the median plane. Thus, under imposed drift, the angle formed by the cords of the last ply with the trajectory will be smaller, such an angle being, when the cords are orientated in the more favorable direction, equal to their angle with the median plane less the imposed drift angle. This is why, in a variation of the invention, and especially when the left tire has the same ply arrangement as the right tire to avoid the manufacture of different tires for the right and left sides of a vehicle, the cords of the last working ply form with the median longitudinal plane an angle which is smaller than the angle of the cords of the working ply or plies directed the other way.

Another modification enables the same tire to be used on both the left and the right sides of the vehicle by placing a given sidewall of the tire towards the inside of the vehicle according to whether the tire is mounted on the right or on the left side. This modification provides on each side of the median longitudinal plane of the tire a different sequence of working plies, e.g., the last working ply extends over approximately half of the width of the tread on one side of the median plane, leaving uncovered on the other side of the median plane the next to the last working ply which has a different inclination or angle to the median plane, the next to the last working ply being arranged to extend over substantially the entire width of the tread and cover another ply extending over an area which is complementary to the area over which the last ply extends.

This modification can be produced in various ways. For example, one ply of normal width may be assembled with two plies of lesser width with a direction different from that of the normal width ply, the normal width ply being positioned radially between the narrower plies which are on opposite sides of the median plane. A particularly advantageous ply arrangement comprises a single wider than normal ply with the lateral portions of the ply being folded back into overlapping relation to the center portion of the ply, one lateral portion being above and the other lateral portion being below the center portion.

In accordance with the invention, it is advisable when mounting such a tire to take into account the position and the direction of the last ply having a narrower width. As between the two mounting positions (left or right) it is advisable to choose the position which places the last ply in the most favorable position to withstand compression and harmful stresses which are exerted more strongly on the inside of the tire when it is subjected to centrifugal force.

For example, the last ply of reduced width should be on the right, i.e., on the outside, for a right tire and on the inside for a left tire, if the ply is directed towards the right. These positions should be reversed if the last narrow ply is directed towards the left. A last ply may have a structure such that the direction of the cords thereof changes near the median plane. Such a ply can consist of either wires or cords in V-shape or of two half-plies placed side by side and having cords which are arranged symmetrically with respect to the median plane. This ply structure, while embodying the invention, is, however, not a preferred arrangement inasmuch as it requires that at least two other working plies having different directions be provided underneath the last ply in order to assure satisfactory road-holding ability.

The invention will be understood better by reference to the accompanying drawings, in which:

FIGURE 1 is a cross-sectional view of a portion of a tire embodying the present invention;

FIGURES 2, 3, and 4 are plan and partial sectional views of portions of the tires embodying the invention showing the relations of the cords of the plies of the tires;

Figure 5:
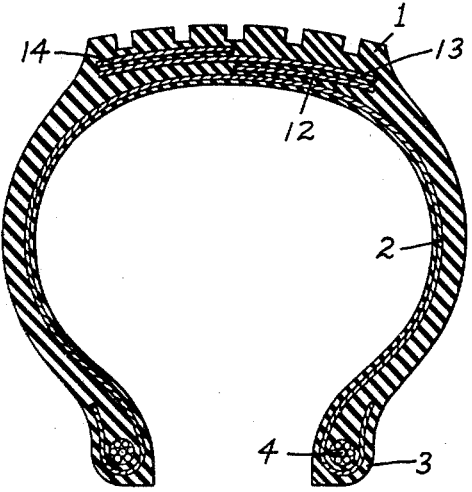
FIGURE 5 is a cross-sectional view of a portion of a modified form of tire embodying the invention.

In all the figures of the drawings, the tires have a tread 1, a carcass 2, rim engaging beads and bead cables 3 and 4, respectively. In all examples, the cords of the carcass 2 are arranged radially, i.e., they are located in radial planes, as shown, passing through the axis of rotation of the tire.

In the exemplary form of the invention shown in FIGURE 1, the tire includes two superimposed crown plies 5 and 6 of cords underneath the tread 1 forming angles of substantially equal size but inclined in opposite directions with respect to the longitudinal direction of the tire. Other crown and protective plies can be disposed radially inward of the ply 5 or between the plies 5 and 6.

FIGURE 2 shows the direction of inclination of the cords in a tire to be mounted on the left side of a vehicle. In this tire, the cords of the first (inner) working ply 5 are directed towards the left and the cords of the last working ply 6 are directed towards the right.

FIGURE 3 discloses a tire to be mounted on the right side wherein, in accordance with the invention, the cords of the first working ply 7 are directed towards the right and the cords of the last working ply 8 are directed towards the left.

FIGURE 4 discloses a tire to be mounted on the right side inasmuch as the cords of the last working ply 10 are directed towards the left and the cords of the ply 9 towards the right. However, this ply structure provides for better wear resistance and handling properties when mounted on a left wheel than the tire shown in FIGURE 3, for the reason that the inclination of the cords of the last working ply 10 relative to the longitudinal direction of the tire forms an angle A which is substantially less than angle B of the cords of the first working ply 9. The ply structure in the tire shown in FIGURE 4 constitutes the best compromise if the same tires are to be used on both sides of the vehicle, at least in countries with right-hand traffic. In other left-hand drive countries, the cords of ply 10 would be directed towards the right, those of ply 9 towards the left.

FIGURES 5 to 8 illustrate other tires which can be used on both sides of the vehicle, with only a selected direction of mounting on the wheel to be observed. The ply structure disclosed in these figures are characteristic in that they all comprise one wide ply of cords extending over most of the width of the tread, such ply being interposed between two plies of lesser width, each extending only over approximately half of the width of the wide ply. In the tire shown in FIGURE 6, the cords of the innermost narrow ply 12 are directed towards the right, those of the wide middle ply 13 towards the left, and those of the ply 14 towards the right.

Figure 6:
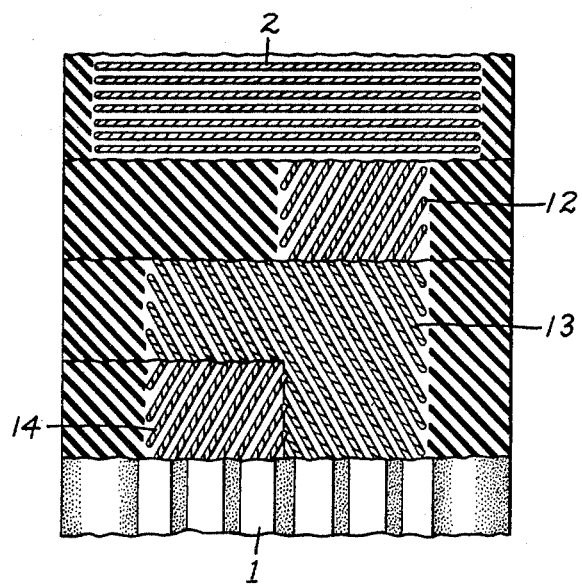
FIGURE 6 is a plan and partial sectional view of a portion of the tire shown in FIGURE 1.
Figure 7:
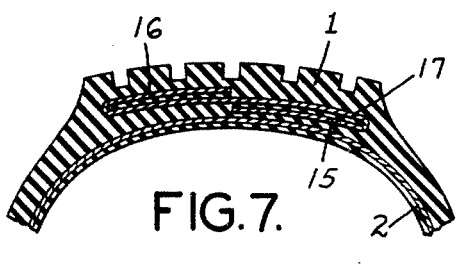
FIGURES 7 and 8 are cross-sectional views of portions of still other modifications of tires embodying the invention.

The ply structure shown in FIGURE 7 is a simplified arrangement comprising a single ply having a total width substantially equalling the sum of the widths of the wide ply 13 and the narrow plies 12 and 14 of FIGURE 6. In the FIGURE 7 modification the edges 15 and 16 of the single wide ply are folded back below and above, respectively, the middle portion 17 which spans the tread zone.

Figure 8:
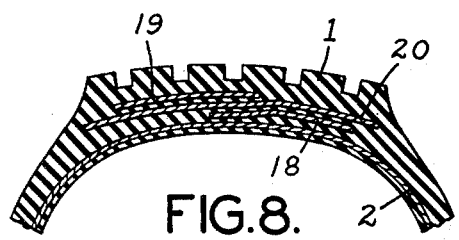

FIGURE 8 shows another modification in which the longitudinal edges of the two narrower plies 18 and 19 on opposite sides of the wider middle ply 20 may overlap in the center of the tire, and moreover, illustrates, that in the tire leaving the vulcanizing mold, the position of the plies may be slightly different, due to the compressive stresses which are irregularly distributed during vulcanization, whereby part of the ply 20 may form a prolongation of the ply 18 and/or ply 19.

The advantages afforded by the invention are illustrated by tests carried out with two series of tires (A and B) measuring 11.00–20. These tires had radial carcasses consisting of metal cords arranged in meridian planes. The tires included three crown plies, the third ply being the last working ply, and a so-called "protective" ply, consisting of metal cords directed as shown in the table below. This table gives the size of the angle formed by these cords with the median longitudinal plan of the tire under consideration, the direction of these cords and the width of each ply.

|  | Series A | | Series B | |
| --- | --- | --- | --- | --- |
|  | Angle | Direction | Angle | Direction |
| First crown ply, width 166mm | 65° | Right | 65° | Left. |
| Second crown ply, width 188 mm | 22° | do | 22° | Do. |
| Third crown ply, width 170 mm | 22° | Left | 22° | Right. |
| Protective ply, width 104 mm | 22° | do | 22° | Do. |

In the course of these tests, the tires of both series were driven with an imposed drift angle of 1°30′ on a testing machine. With a drift directed towards the left, the tires of the Series A, the last crown ply (working ply) of which consists of cords directed towards the left, rolled an average of 25,000 km. without damage while with a drift directed towards the right, it was found that at 10,-000 km., the cords of the crown plies of these tires were partially breaking away from the surrounding elastomer. With tires of the Series B, the greatest number of kilometers was obtained for a drift directed towards the right, i.e., in the same direction as the cords of the third crown ply.

The above tests are indicative of only one type of tire construction but other similar tests on tires having different arrangements falling within the scope of the present invention have given similar results. Accordingly, it should be understood that the examples given herein are illustrative and that many other variations and modifications falling within the scope of the invention are possible. Accordingly, the invention is limited only as defined in the following claims.

I claim:

1. A tire casing having a tread, sides extending inwardly from opposite edges of said tread, and beads at the inner edges of said sides, comprising a reinforcement for at least said tread including a plurality of superimposed working plies of cords, the cords of each ply being substantially parallel and the cords of one ply being inclined relative to the cords of another ply, said cords of the outermost working ply being directed toward the left for a right tire and toward the right for a left, said outermost working ply being disposed substantially entirely on one side of said median plane, a second working ply being disposed inwardly of said outermost ply and being substantially coextensive with said tread and a third working ply being disposed inwardly of said second ply and substantially entirely on the other side of said median plane.

2. The tire casing set forth in claim 1 in which said outermost ply, said second ply and said third ply are separate plies and the cords of said third and outermost plies are inclined in crossing relation to the cords of said second ply.

3. The tire casing set forth in claim 1 in which said outermost and third plies are folded edge portions of said second ply, the cords of all of said plies being inclined relative to the median plane of said tire casing with the cords of said folded edge portions crossing and inclined relative to said cords of said second ply.

References Cited

UNITED STATES PATENTS

| | | | |
|---|---|---|---|
| 3,195,602 | 7/1965 | Keefe | 152—361 |
| 3,057,392 | 10/1962 | Nallinger | 152—361 |
| 3,175,598 | 3/1965 | Cegnar | 152—361 |
| 3,231,000 | 1/1966 | Massoubre | 152—361 |
| 3,357,470 | 12/1967 | Massoubre | 152—361 |

ARTHUR L. LA POINT, Primary Examiner

C. B. LYON, Assistant Examiner